United States Patent [19]
Lobello et al.

[11] 3,941,028
[45] Mar. 2, 1976

[54] MINE ROOF EXPANSION ANCHOR

[75] Inventors: John Lobello, Syracuse, N.Y.; George W. Allen, Hudson, Ohio

[73] Assignee: The Eastern Company, Naugatuck, Conn.

[22] Filed: Mar. 6, 1975

[21] Appl. No.: 555,717

[52] U.S. Cl. .................................. 85/73; 85/87
[51] Int. Cl.² ................................... F16B 13/06
[58] Field of Search ............ 85/67, 69, 73, 74, 75, 85/76, 77, 78, 79, 87, 86, 1 K, 32 V, 36; 151/69

[56] References Cited
UNITED STATES PATENTS

| | | | |
|---|---|---|---|
| 1,455,080 | 5/1923 | Croson et al. ............... | 85/32 V |
| 2,535,879 | 12/1950 | Tinnerman ..................... | 85/36 |
| 2,969,705 | 1/1961 | Becker .......................... | 85/36 |
| 3,000,254 | 9/1961 | Hottenstein ................... | 85/75 |
| 3,349,662 | 10/1967 | Williams ........................ | 85/74 |
| 3,406,734 | 10/1968 | Munse .......................... | 85/36 |
| 3,430,408 | 3/1969 | Dean ............................ | 85/36 |
| 3,577,825 | 5/1971 | Reusser ........................ | 85/76 |
| 3,851,559 | 12/1974 | Baude .......................... | 85/87 |
| 3,876,821 | 4/1975 | Pringle ......................... | 85/36 |

FOREIGN PATENTS OR APPLICATIONS

| | | | |
|---|---|---|---|
| 723,211 | 2/1955 | United Kingdom ............. | 85/73 |
| 886,857 | 1/1962 | United Kingdom ............. | 85/73 |
| 1,109,570 | 4/1968 | United Kingdom ............. | 85/87 |

Primary Examiner—Roy D. Frazier
Assistant Examiner—Thomas J. Holko
Attorney, Agent, or Firm—Charles S. McGuire

[57] ABSTRACT

An expansion bolt assembly of the type used in supporting mine roofs including an expansible shell having a tapered plug movable axially therein to force the outer surface of the shell into engagement with the interior of a drilled opening in the mine roof. The plug is moved by rotation in a threaded opening thereof of an axially fixed bolt, the plug being rotationally fixed with respect to the shell. The invention resides in the structure maintaining the bolt, plug and shell in assembled relationship during insertion into the drilled opening which comprises a circular metal stamping having a central opening through which the bolt is threaded and means for frictionally engaging the sides of the shell.

7 Claims, 6 Drawing Figures

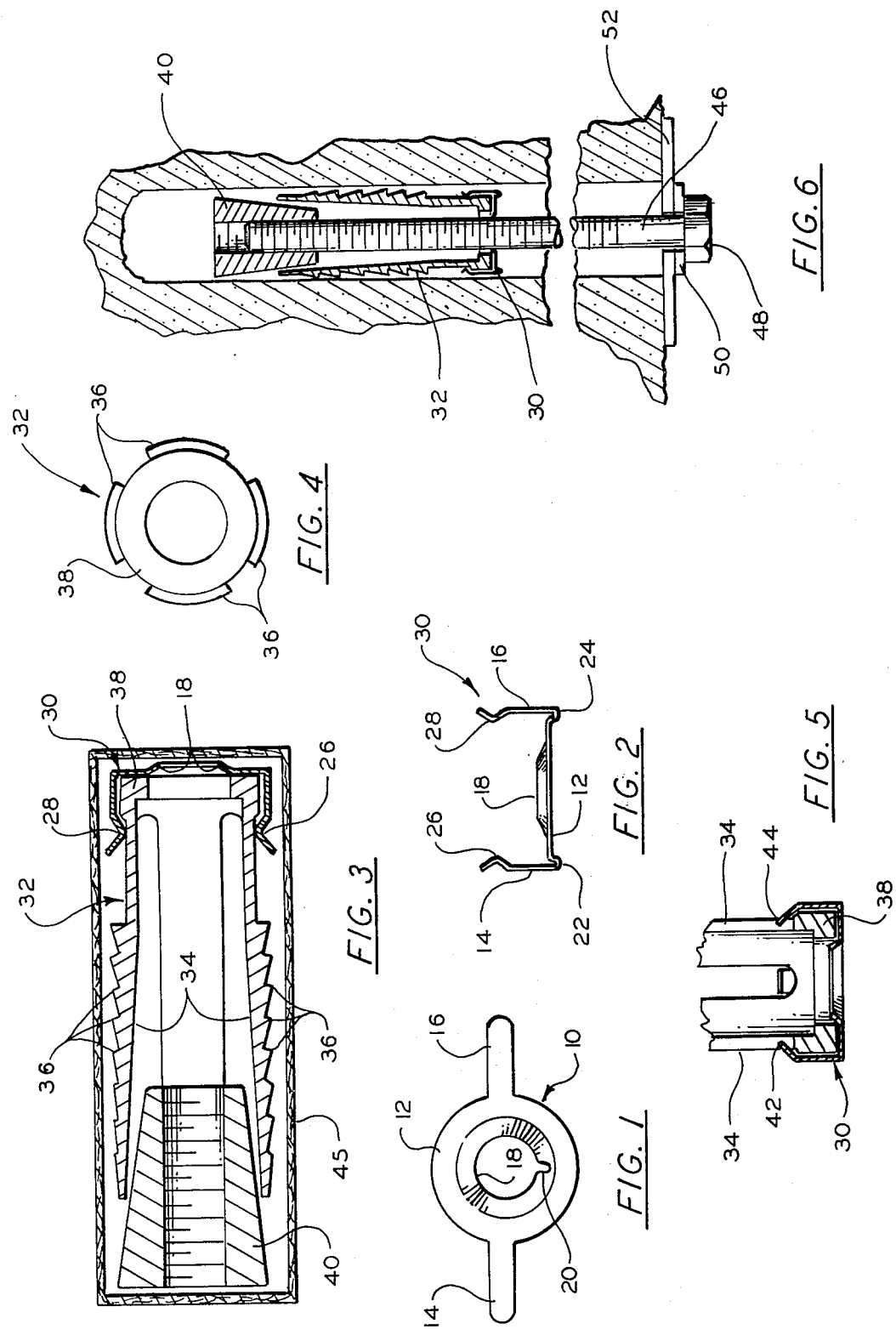

MINE ROOF EXPANSION ANCHOR

BACKGROUND OF THE INVENTION

The present invention relates to mine roof anchors and, more specifically, to novel means for retaining a shell, a tapered expansion plug, and a threaded bolt in assembled relationship prior to engagement within a hole in the mine roof.

Mine roofs are commonly supported by plates held in position by the head of a bolt extending into and fixedly retained in an opening drilled for such purpose in the mine roof. One of the most widely used means for retaining the bolt is a so-called expansion anchor, comprising an expansible shell and a tapered plug having an opening in which the bolt is threaded. Since the tapered plug and bolt, although threadedly connected to one another, are not otherwise connected to the shell, it is necessary to provide means for maintaining the elements in properly assembled relation prior to use and during insertion into the hole.

Several different means have been used for the purpose of holding the bolt, shell and plug in the desired relationship. One of the most familiar is a bail or strap attached in some manner to the shell and passing over the end of the plug. This maintains the shell and plug in assembled relationship prior to threading the bolt into the plug. As the assembly is inserted upwardly into the drilled hole, the shell is prevented from falling out of position by engagement therewith of the strap.

Another is the so-called "pal nut" which is threaded on the bolt below the shell, the plug being threaded on above the shell. This is usually a relatively thin or fragile nut which may be twisted or sheared off as the bolt is rotated to pull the plug into the shell and effect expansion thereof. The pal nut does not, of course, retain the plug in assembled relation with the shell, and is not itself attached in any way to the shell. Each item is provided separately and the bolt is threaded through the pal nut and into the plug, with the shell therebetween, at the time when the assembly is to be inserted in the drilled hole in the mine roof. The pal nut merely serves as a stop, preventing the shell from falling down the bolt when inserted upwardly into the hole. The opening in the pal nut is provided with a thread which may be cast, machined or stamped, depending on the type of nut, but in any case the nut has the usual hexagonal outer periphery and, as previously mentioned, is not attached or engaged in any manner with the shell.

The cost of anchor assemblies having straps or bails to maintain the plug and shell in assembled relation is increased by the added labor involved in assembling the shell, plug and bail prior to shipment. Although the cost is less when a pal nut is used instead of a bail, it is more difficult to assemble the separate elements on the bolt when ready for use, and there is a greater possibility of the pal nut being dropped or lost since it is not connected to the shell.

It is a principal object of the present invention to provide a mine roof expansion anchor having novel and improved means for retaining the elements in assembled relation.

A further object is to provide a retaining member for a mine roof expansion shell which is low in cost, yet is engaged with the shell prior to use.

Other objects will in part be obvious and will in part appear hereinafter.

SUMMARY OF THE INVENTION

In accordance with the foregoing objects, the invention includes a simple and inexpensive retaining element which is preferably formed entirely of sheet metal by a common stamping process. The element includes an annular portion having an outer diameter approximately equal to that of the expansion shell end over which it is placed. The central opening in the element is in the form of a stamped thread, i.e., the edge defines a spiral having a pitch equal to that of the bolt threads.

A pair of relatively narrow strips, formed integrally with the annular portion, extend from opposite sides thereof and are bent to extend in the same direction. Thus, the strips form a pair of ears, approximately parallel to one another and perpendicular to the plane of the annular portion. The ears are bent at an intermediate point to provide inwardly facing detents for engaging the outside surface of the shell and maintaining the element in engagement therewith.

BRIEF DESCRIPTION OF THE FIGURES

FIG. 1 is a plan view of a metal stamping forming an element of the invention;

FIG. 2 is a plan view of the element of FIG. 1 in its finished form;

FIG. 3 is a front view in half section of the element of FIG. 2 in assembled relation with additional elements;

FIG. 4 is a bottom plan view of one of the elements of FIG. 3;

FIG. 5 is a fragmentary, front view, in half section, of a modified form of the element of FIGS. 1 and 2; and FIG. 6 is a front view in half section of the assembly of FIG. 3 in position during use.

DETAILED DESCRIPTION

Referring now to the drawings, reference numeral 10 denotes a metal stamping formed, for example, of 0.020 to 0.024 inch thick spring steel. Stamping 10 includes substantially planar, annular portion 12 with relatively narrow strips 14 and 16 extending outwardly from opposite sides thereof. A central opening is formed as a stamped thread impression in conventional manner. That is, inner edge 18 defines a spiral path having a desired pitch. A small cut-out 20 is provided to allow for the offset, or pitch of inner edge 18.

After stamping 10 is formed as shown in FIG. 1, strips 14 and 16 are bent to extend approximately parallel to one another, as seen in FIG. 2. Preferably, the bending is carried out in two steps to lend added rigidity. That is, the strips are bent first in one direction to extend approximately perpendicularly from portion 12, and then bent back upon themselves, closely adjacent the first bend, thereby forming bends 22 and 24 in strips 14 and 16, respectively, with the strips extending substantially parallel to one another in the opposite direction from portion 12 as bends 22 and 24. It will also be noted from FIG. 2 that strips 14 and 16 in their final form extend in the same direction from portion 12 as the thread impression formed by edge 18.

Strips 14 and 16 are additionally bent at an intermediate point, preferably near the free ends thereof, to provide inwardly facing detents 26 and 28. In its final form, stamping 10 provides a portion of a mine roof anchor assembly, and will hereinafter be referred to as retainer element 30.

Referring now to FIG. 3, retainer element 30 is shown in assembled relation with expansion shell 32 of the anchor assembly. Shell 32 may take any of a variety of conventional forms including, by way of example and not by limitation, those shown in U.S. Pat. No. 3,134,289, wherein the shell is in a plurality of separate segments initially retained together by some appropriate means, and in U.S. Pat. No. 3,315,557, wherein the shell includes a plurality of fingers extending integrally from a base ring. In any case, shell 32 forms a hollow expansion member having open ends. In the form shown herein, shell 32 is of the type having four individual expansion fingers, two of which are seen in the half sectional view of FIG. 3, denoted by reference numeral 34. Fingers 34 have several rows of teeth 36 on the outer surfaces thereof and are each formed integrally with an annular base ring 38.

Tapered plug 40, also entirely conventional in structure and function, has one end smaller and one larger than the open end of shell 32 formed by the free ends of fingers 34. Thus, plug 40 may be partially inserted, small end first, into the open end of shell 32 defined by fingers 34, but moving the plug axially further into the shell will force the fingers outwardly.

The three portions of the assembly, i.e., retainer element 30, shell 32 and plug 40, are shown in FIG. 3 as they would normally be packaged for shipment and up to the time of use. Element 30 is placed over the open end of shell 32 defined by annular ring 38, in generally covering relation to the ring opening. The space between detents 26 and 28 is less than the outside dimension of the end of shell 32 (shown in FIG. 4) upon which element 30 is engaged, whereby strips 14 and 16 are flexed slightly outward and the element is frictionally retained to the shell. Some shells may be formed with a slight lip on the outer surface, which aids in engagement of the detents. Also, in a slightly modified construction, shown in FIG. 5, rather than being bent at an intermediate position, free ends 42 and 44 may be bent inwardly and engaged over base ring 38 of the expansion shell in the spaces between fingers 32.

Referring again to FIG. 3, the size of package 45, e.g., a paper or cardboard container, is seen to be such that plug 40 will be retained in the open end of shell 32 until the package is opened. By opening the left end (as viewed in FIG. 3) of package 45, the assembly may be removed from the package and may easily be held with one hand grasping both plug 40 and shell 32. Since retainer 30 is engaged on shell 32 in the manner previously described, it need not be manually engaged in order to remain in position. Thus, the assembly may be removed from its package and held in one hand, as the bolt is threaded first through the stamped thread impression of element 30, and then through the central, threaded opening in plug 40.

The elements are shown in FIG. 6 as they would appear during use in a drilled hole in a mine roof. Bolt 46 has been threaded through element 30 which thereby serves as a stop for shell 32 when the bolt is raised to a vertical position. Bolt head 48 engages washer 50 and holds plate 52 against the mine roof to perform the desired retaining function. Using a wrench to turn bolt head 48 will draw plug 40, which is restrained against rotation by the fingers of shell 32, downwardly to expand the fingers and cause teeth 36 to engage the interior of the drilled hole.

Thus, it may be seen that the invention provides an expansion shell assembly which may be easily and quickly assembled with the bolt when ready for use without danger of the parts becoming separated and lost, as with assemblies employing "pal nuts". The assembly is also more economical to fabricate and assemble than prior assemblies using bails to retain the shell in position during insertion into the drilled hole.

What is claimed is:

1. A mine roof anchor assembly comprising:
   a. a threaded bolt:
   b. a tapered plug having large and small ends and a central, threaded opening extending therethrough, into which said bolt is threaded;
   c. a hollow expansion shell having a first open end having an inner transverse dimension larger than the small end and smaller than the large end of said plug, whereby axial movement of said plug into said first open end effects expansion of said shell, and a second open end having an inner transverse dimension larger than the diameter of said bolt and through which said bolt extends; and
   d. a retaining element in generally covering relation to said second open end, said element having a substantially planar portion with a central opening through which said bolt is threaded, and an engagement portion comprising at least two strips formed integrally with and extending from opposite sides of said planar portion, substantially perpendicular thereto, to engage said shell and hold said retaining element in engagement therewith.

2. The invention according to claim 1 wherein said planar portion has an outer periphery corresponding substantially in size and shape to the outer periphery of said second open end of said shell.

3. The invention according to claim 1 wherein said retaining element is formed from a metal stamping.

4. The invention according to claim 1 wherein said strips include inwardly facing detents engaging the outer surface of said shell.

5. The invention according to claim 4 wherein said planar portion is annular.

6. The invention according to claim 5 wherein said second open end is annular, the outer diameters of said planar portion and said second open end being substantially equal.

7. The invention according to claim 6 wherein the inner diameter of said planar portion comprises a stamped thread impression.

* * * * *